Patented Feb. 27, 1945

2,370,126

UNITED STATES PATENT OFFICE 2,370,126

PROCESS OF MAKING POLYVINYL ACETALS

Joseph Dahle, West Newton, Mass., assignor, by mesne assignments, to Pro-phy-lac-tic Brush Company, Northampton, Mass., a corporation of Delaware No Drawing. Application March 6, 1942,
Serial No. 433,678

6 Claims. (Cl. 117—47)

The present invention relates to improvements in the topochemical treatment of solid polyvinyl alcohol or articles made therefrom as described in the prior applications of Joseph Dahle, Serial No. 388,144, filed April 1¹, 1941, and Serial No. 433,677, filed March 6, 1942. In the first of these applications has been described the treatment of solid polyvinyl alcohol or articles made therefrom with a monomeric acetal and aldehyde to convert the surface at least of the polyvinyl alcohol into a water insoluble acetal. In the second of these applications an improved process was described in which the treatment was accomplished solely by the use of the monomeric acetal without the use of free aldehyde. The present invention has to do with means by which the speed and extent of the reaction by which solid polyvinyl alcohol may be converted into an acetal is increased.

The present invention is based upon the discovery that if solid polyvinyl alcohol be treated with a solution containing a relatively high concentration of catalyst before being placed in the reaction bath of monomeric acetal, the acetal reaction in the reaction bath will proceed more rapidly and further than otherwise would be the case. I believe that during the preliminary treatment the catalyst is adsorbed on the polyvinyl alcohol and so is concentrated where it is most effective. Consequently, the reaction is stimulated to a greater extent than is the case where the catalyst is placed in the reaction bath. It will be understood, however, that, even with the pre-treatment with the catalyst, it is probably desirable to use catalyst in the reaction bath.

In practicing my invention for the production of sheeting. I first dry the sheeting in an oven preferably, at from 70° to 100° C. continuing the drying until the sheeting is practically moisture free. The drying should not remove all traces of moisture for I have found that the reaction proceeds best when most, but not all, of the moisture is removed. I believe that the presence of a small amount of moisture maintains the polyvinyl alcohol in slightly swollen condition, so that the catalyst and the reactant are able to be adsorbed more quickly and completely, but moisture is not present in sufficient quantity to retard the reaction.

The most satisfactory catalyst which I have found is sulphuric acid or its alkyl derivatives formed as a consequence of its mixture with a solvent medium. The liquid medium in which the catalyst is dissolved should be one not having too high a boiling point and sufficient compatibility with the catalyst, but it must not be a solvent for polyvinyl alcohol. For use with sulphuric acid, I prefer methyl formal as a solvent medium, but find that acetone is also satisfactory. Alcohols are less desirable because they tend to suppress the subsequent acetal reaction. Where methyl formal is used as the reactant, in the reacting bath, and as the medium for the solution of the catalyst in the first bath, it serves a double purpose since it is both a medium for the catalyst in the first bath, and also begins the acetal reaction which is the purpose of the process.

I have found that when methyl formal and sulphuric acid are mixed in proportions of less than about 16 parts by weight of the sulphuric acid to 100 parts of the methyl formal, the mixture forms into two layers and that the acid concentration of the upper layer increases with an increase in the proportion of sulphuric acid used. If about 16% by weight is used, the acid and the formal are completely miscible. If less than 16% is to be used, the materials are first mixed and then the supernatant liquid is drawn off and used as a treating bath. In practice, however, I prefer to use a pre-treating bath containing more than 16% of sulphuric acid.

The sheet material is immersed in this bath for a period which may be varied according to circumstances, for instance, from one second to two minutes or even more. If the sheet material is allowed to remain in the pre-treatment bath too long a permanent surface precipitation is likely to be produced and the transparency of the sheeting is interfered with. However, this constitutes a convenient method of producing a matte surface on the finished sheeting if that is desired. After being immersed as described in the pre-treatment bath, the sheet is removed and may be dried or may be passed, while still wet, into the reaction bath of monomeric acetal and the aldehyde, as described in application Serial No. 388,144 or into a bath of the monomeric acetal as described in my application Serial No. 433,677, filed March 6, 1942 and it will be found that the period of treatment required for a given degree of reaction is greatly reduced.

The invention will be more fully understood from the following examples:

*Example 1.*—Polyvinyl alcohol sheeting 0.0025" thick was air dried as described for 1 hour in an oven at 100° C. and was then immersed for 10 seconds in a pre-treatment bath consisting of methylformal 100 parts by weight and sulphuric acid 19 parts by weight. It was then taken from the bath, the surplus liquid removed and the sheet immersed in a bath consisting of methylformal 100 parts by weight and sulphuric acid 0.14 by weight. After 1 hour the sheeting was removed, air dried, neutralized, washed and dried. The sheeting was found to be insoluble in boiling water even upon prolonged boiling, although before the treatments the sheeting dissolved in boiling water in 1 minute. On analysis the sheeting was found to contain 75.2% unreacted alcohol groups calculated as vinyl alcohol.

*Example 1-A.*—Polyvinyl alcohol sheeting 0.0025" thick made by alkaline hydrolysis and containing 17% glycerin as plasticizer was dried in an oven at 70° C. for two hours, and then pretreated for 10 seconds in a methyl formal bath containing 19% of sulphuric acid. It was air dried for 30 seconds and then immersed for 6 hours at room temperature in methylformal containing 0.35 gram of sulphuric acid per 100 cubic centimeters of the bath. It was then air dried for 30 minutes, neutralized, washed and dried. On analysis, it was found to contain 33.2% unreacted alcohol groups calculated as vinyl alcohol.

The effect of the pre-treatment is shown by the fact that similar sheeting treated in the same way except that the pre-treatment was omitted and the sheeting was kept in the reaction bath 7 hours instead of 6 hours showed 37.2% unreacted alcohol groups calculated as vinyl alcohol.

*Example 2.*—The same kind of polyvinyl alcohol sheeting was treated as described in Example 1 except that the immersion time in the pretreatment bath was 30 seconds. On analysis it was found to contain 62.5% of unreacted alcohol groups calculated as vinyl alcohol. It will be seen that the additional 20 seconds in the pre-treatment bath decreased the unreacted alcohol groups by $12\frac{7}{10}$%. In this case, however, surface precipitation was noted when the sheeting was transferred to the reaction bath and the final sheet had a matte surface.

*Example 3.*—Polyvinyl alcohol sheeting of the same character as used in Examples 1 and 2 was immersed for 2 minutes in the pre-treatment bath described in those examples. It was then transferred without intermediate drying to a bath consisting of methylformal 100 parts by weight, sulphuric acid 0.14 parts by weight and diethylphthalate 11 parts by weight. After 4 minutes in the reaction bath the resulting sheeting was found after washing and drying to be insoluble in boiling water. It showed a content of 45.8% of unreacted alcohol groups.

*Example 4.*—The same kind of sheeting as in the previous examples was immersed in the pre-treatment bath described in the examples for 75 seconds and was then transferred without drying to a bath containing methylformal 100 parts by weight, sulphuric acid 0.14 parts by weight and diethylphthalate 33 parts by weight. It was allowed to remain in the reaction bath for 18 hours. On removal, washing, neutralization, and drying the sheeting was analyzed and found to contain 19% of unreacted alcohol groups calculated as vinyl alcohol. The sheeting was insoluble in boiling water.

I claim:

1. The process of forming polymeric vinyl acetals which consists in treating solid polyvinyl alcohol with a catalyst dissolved in a non-solvent of polyvinyl alcohol and then reacting the solid polyvinyl alcohol in a bath composed of a liquid monomeric acetal and a catalyst, the concentration of catalyst in said non-solvent being high compared with the concentration in said bath.

2. The process of forming polymeric vinyl acetals which consists in treating solid polyvinyl alcohol with a mixture of methyl formal and sulphuric acid, the mixture having a high acid content, and then treating it with methyl formal and a catalyst, the catalyst being relatively low, to produce a polyvinyl acetal, the polyvinyl alcohol and the polyvinyl acetal being in the solid state throughout the process.

3. The process of forming polyvinyl acetals which consists in drying solid polyvinyl alcohol to render it substantially moisture free, then treating it with a catalyst in solution in a non-solvent for polyvinyl alcohol and having a high catalyst content and then reacting it in a solution of a liquid monomeric acetal and a catalyst in which the catalyst content is relatively low, to produce a polyvinyl acetal, the polyvinyl alcohol and the resulting polyvinyl acetal being in a solid state throughout the process.

4. A process of forming polyvinyl acetals which consists in drying solid polyvinyl alcohol to render it substantially moisture free, then treating it with a mixture of methyl formal and sulphuric acid of high acid content, and then reacting it in a solution of methyl formal and a catalyst, the catalyst content being relatively low, to produce a polyvinyl acetal, the polyvinyl alcohol and the resulting polyvinyl acetal being in a solid state throughout the process.

5. The process of producing articles of polymeric vinyl acetal which consists in forming an article of solid polyvinyl alcohol, pre-treating the formed article with catalyst in solution in a non-solvent for polyvinyl alcohol, and then reacting the article in a reaction bath containing a monomeric acetal to produce polyvinyl acetal.

6. The process of producing articles of polymeric vinyl acetal which consists in forming an article of solid polyvinyl alcohol, pre-treating the formed article with a solution of catalyst in a non-solvent for polyvinyl alcohol and then reacting the article in a reaction bath containing monomeric acetal to produce a polyvinyl acetal.

JOSEPH DAHLE.